United States Patent [19]

Yves et al.

[11] 4,335,001

[45] Jun. 15, 1982

[54] PROCESS AND DEVICE FOR SEPARATION OF EMULSIONS BY COALESCENCE

[75] Inventors: Yves Aurelle, Aucamville; Jean-Paul Calteau, Saint-Louis; Henri Roques, Portet-sur-Garo, all of France

[73] Assignee: Agence Nationale de Valorisation de la Recherche (A.N.V.A.R.), Neuilly-sur-Seine, France

[21] Appl. No.: 96,580

[22] Filed: Nov. 21, 1979

Related U.S. Application Data

[63] Continuation of Ser. No. 866,817, Jan. 4, 1978, abandoned.

[30] Foreign Application Priority Data

Jan. 4, 1977 [FR] France .............................. 77 00203

[51] Int. Cl.³ ............................................ B01D 17/04
[52] U.S. Cl. ................... 210/708; 210/489; 210/502; 210/521; 210/800; 210/DIG. 5; 210/924
[58] Field of Search ............... 210/488, 502, DIG. 5, 210/23 R, 40, 83, 350, 400–402, DIG. 26, 456, 521, 522, 535, 489, 307, 708, 800

[56] References Cited

U.S. PATENT DOCUMENTS

| | | | |
|---|---|---|---|
| 3,142,612 | 7/1964 | Reiman | 210/DIG. 5 |
| 3,847,821 | 11/1974 | Krueger | 210/DIG. 5 |
| 4,083,778 | 4/1978 | McGrew | 210/DIG. 5 |

Primary Examiner—S. Leon Bashore
Assistant Examiner—F. H. Lander
Attorney, Agent, or Firm—Shlesinger, Arkwright, Garvey & Dinsmore

[57] ABSTRACT

A method and apparatus for the separation of an emulsion of at least one dispersed phase emulsified in at least one continuous phase of different density wherein the emulsion is passed into a vessel and axially through a fixed coalescing bed for coalescing the dispersed phase, and continuing the flow over a guide wettable by the dispersed phase whereby the coalesced dispersed phase travels along the guide axially to establish a layer of the coalesced dispersed phase and the continuous phase passes substantially radially outwardly through the guide to establish a layer of the continuous phase, the interface of the dispersed phase and the continuous phase being maintained at approximately the midpoint of the guide.

13 Claims, 4 Drawing Figures

PROCESS AND DEVICE FOR SEPARATION OF EMULSIONS BY COALESCENCE

This is a continuation of application No. 866,817, filed Jan. 4, 1978 now abandoned.

The invention relates to a process and a device for separation of emulsions by coalescence.

The process is of the type in which the emulsion is passed through a fixed coalescing bed 4 which comprises of a finely divided or porous material, preferably wetted by the dispersed phase. In the invention, the process consists of guiding the dispersed phase from the coalescing bed toward a final bed constituted of this phase which is already separated. This guide is realized by means of a packing 6 of a material in particle or porous state, preferably wetted by the dispersed phase, this packing reaching into the layer of dispersed phase which is already separated.

The process can be used to separate either direct or inverse emulsions, constituted of an organic phase and an aqueous phase. It allows for considerable extension of the performance of the coalescence phenomena and reduction of the limits beyond which these phenomena are no longer operative in traditional processes.

The invention relates to a process for separation of emulsions by coalescence by using a fixed coalescing bed preferably wetted by the dispersed phase; it also extends to devices to carry out this process.

The coalescence/separation of an emulsion of microdroplets dispersed in a continuous phase is generally realized by passing the emulsion through a fixed bed of fibrous or granular material which is preferably wetted by the dispersed phase. At discharge from the coalescing bed, the dispersed phase is in the form of coalesced drops which decant through the continuous phase and are thus separated therefrom. In the case of the separation of an organic dispersed phase in emulsion in an aqueous continuous phase, the coalescing bed can be constituted of fibers or granular materials which are oleophilic and hydrophobic.

Another and less prevalent process consists of replacing the fixed bed preferably wetted by the dispersed phase with a fixed bed preferably wetted by the other phase; for certain applications, this type of bed gives better performance, although the reasons which cause one or the other bed to perform more satisfactorily are not now known.

These processes of coalescence in a fixed bed are very advantageous in comparision with other processes for separation, in other words centrifugation, electrocoalescence, decantation, etc. . . . , because they generally permit the resolution of the secondary emulsions, which are extremely stable, of which the droplets are on the order of several microns in diameter. Moreover, the apparatus required to carry out this type of process is simple and the operation and investment expenses are very low in comparision with other processes.

In addition to that, these additional processes can be used only within narrow operating limits.

In the first place, there is a critical velocity of passage of the emulsion through the fixed bed which is found in the case of a bed preferably wetted by the dispersed phase or a bed preferably wetted by the continuous phase. If the emulsion is passed through the bed at greater velocity than this critical velocity, the separation is no longer effected correctly and, instead of large coalesced drops at the discharge from the bed, which are easy to separate from the continuous phase by decantation, there appears either a sort of foam or scum in the case of beds which are preferably wetted by the dispersed phase, or very fine droplets of less than a tenth of a millimeter diameter in the case of beds preferably wetted by the continuous phase. In both cases, the foam or the fine droplets remain dispersed in the continuous phase. For example, for hydrocarbons in emulsions in aqueous phase, this critical velocity in the best operating conditions is on the order of 0.3 cm/sec. while using oleophilic resins.

Also, it has been determined that if the interfacial tension between the two phases is too low, i.e. below a value on the order of 10 dynes per cm, then the separation cannot be realized and foam or fine droplets are collected at the discharge from the coalecing bed. For example, it is not possible to separate an aqueous emulsion of isobutyl alcohol with interfacial tension of 2.5 dynes per cem at 25° C. by coalescence.

Finally, it has also been established that if the proportion of the dispersed phase relative to the continuous phase in the emulsion is increased without modification of the other operating conditions, there is a threshold beyond which the dispersed phase also escapes from the coalescing bed in the form of foam of fine droplets.

Also, some documents such as U.S. Pat. No. 3,617,543, U.S. Pat. No. 3,844,743, U.S. Pat. No. 3,893,925 disclose particular structures of coalescing devices provided with a coalescing bed of a material which is preferably wetted by the dispersed phase. These devices do not combine all of the conditions to overcome the aforementioned limitations and the following comments are applicable to them. For example, in U.S. Pat. No. 3,617,548, the decanted bed of hydrocarbon is unavoidably mixed with the continuous aqueous phase if the velocities of passage are increased beyond the critical velocities or if the emulsion is a finely divided secondary emulsion; this is caused particularly by the arrangement of the device and the unfavorable structure of the coalescing bed.

The present invention proposes deletion of all or at least considerable reduction of the aforementioned limitations so as to increase the performances of the phenomena of coalescence and to extend the application range.

For this, the process is accomplished in three stages consisting first of understanding the established phenomena and their causes, and then, of conceiving an idea to act on these causes in order to delete or reduce the aforementioned limitations, and finally in the practical plan of putting this idea into application, and the process according to the invention resides in this application; hereinafter first will be defined this process, and, for understanding of the mechanism, the three stages of the process will then be described in detail.

The object of the process is separation of an emulsion comprising at least one dispersed phase A in emulsion in at least one continuous phase B of different density. In this process, the emulsion is passed through a fixed coalescing bed comprising a material in particle or porous state, preferentially wetted by the dispersed phase A. This process consists of:

feed of the coalescing bed essentially vertically in such a manner as to pass all of the emulsion vertically through this bed.

guide of phase A in the course of its decantation also vertically and at countercurrent to the circulation in the coalescing bed, from discharge from this bed to a final layer which is constituted of phase A which is already separated, with this guiding realized by means of a guide which is in contact with the coalescing bed in series with it and downstream from it, in relation to the direction of circulation, this guide comprises of a packing of a material in particle or porous state, preferentially wetted by phase A, said packing having its end portion in the phase A layer which is already separated, collecting phase A which has come through this guide to enrich this layer while maintaining a suitable thickness of said layer to permit the end portion of the guide to immerse constantly in it, collecting phase B at the periphery of the guide or of the coalescing bed when it escapes in a lateral direction or opposite the direction of flow of the dispersed phase A defined by the guide, and drawing off of the separated phases such that the interface between said separated phases is constantly situated at midlevel on the guide.

It is to be noted that the packing in which forms the guide can pass through or not pass through the final layer of phase A which is already separated; the important point is that it immerse into this layer and it makes no difference whether it comes back out on the other side or not.

This packing is preferably of aerated structure with a high void coefficient or porosity, which permits reduction of the losses of charge while assuring an appropriate guide. The coalescing bed has a known tighter structure.

The process will be explained hereinafter for understanding of both the process and the mechanism.

Experiments on the traditional coalescence processes with fixed bed have permitted analysis of the phenomena which occur in the coalescence bed and at its discharge. Interpretation of the results of these experiments has shown that the phenomena occur in four stages:

a first stage, called interception, wherein a phenomena of interception of the microdroplets of the dispersed phase by the particles of the coalescing bed is developed, a second stage, called adhesion, wherein the microdroplets which are intercepted form a continuous film around each particle, a third stage, called migration, wherein the films formed around the particles are carried along in the form of continuous liquid threads, from one particle to the other through the bed, under the influence of the hydrodynamic forces developed by the liquid flux, a fourth stage, called ejection, wherein an ejection of phenomena is produced, at the edge of the coalescing bed, of the liquid threads of the dispersed phase from the coalescing bed toward the continuous phase which rises above it.

For a satisfactory separation of the two phases, it is necessary that these four stages which have been disclosed by the inventors all occur satisfactorily, in other words so that there is a near certain interception of each microdroplet by the particles, and these droplets adhere to the particles to form continuous films around them, and these films are carried along it continuous liquid threads through the bed, and finally these threads are ejected at this discharge from the coalescing bed in the form of large drops, which can be easily decanted in the middle of the continuous phase wherein they are found.

In the coalescence process used at present, the first stage occurs in a satisfactory fashion, because the granulometry can be adapted empirically, and the level of the vacuum coefficient of the bed provides a good interception. The studies of the inventors permitted establishment that the correct development of this stage was not disturbed greatly by even large variations of the parameters: speed of passage, interfacial tension between phases and proportions of the emulsion. Thus it is not this stage which introduces the limitations.

It has been observed that the development of the second and third stages is greatly influenced by the nature of the material of which the bed is formed. If this material is preferably wetted by the continuous phase, these stages develop very poor conditions and a continuous film is not formed around the particles, but rather separate agglomerates. As soon as the velocity of passage increases, a jet phenomenon is produced and these agglomerates brust into fine droplets which are carried by the continuous phase through the bed.

As opposed to that, this second and this third stage develop satisfactorily if the material selected for the fixed bed is preferably wetted by the dispersed phase; for beds of materials of this nature this suffices, in effect, to determine the formation of continuous films around the particles as well as for their transmission in the form of continuous liquid threads which remain separated from the flux of the continuous phase in the course of their passage through the bed. When the velocity of passage is increased, the films become thinner around the particles, but the phenomenon remains and these films continue to move in continuous threads through the bed at velocities far superior to the abovementioned critical velocities: the velocity of passage thus has an influence on these stages but it is not determinant if the material of the bed is properly selected, and in this case, it is not these stages which cause the appearance of a critical velocity limiting the velocities of passage. Also the interfacial tension between phases plays a role in the development of these stages but without ever being a great obstacle which would disturb this development if a coalescing material is selected which is as dissimilar as possible from the two phases of the emulsions. Finally, the increase of the relative proportion of the dispersed phase in relation to the continuous phase has no unfavorable influence on the development of these two stages.

Observation and interpretation of these phenomena have led to the selection of a bed which is preferably wetted by the dispersed phase which creates a satisfactory development of the second and third stages.

On the other hand, it has been shown on the one hand that the ejection stage of the coalescence has been carried out unfavorably in traditional processes using a fixed bed preferably wetted by the dispersed phase, and on the other hand, that this stage was greatly influenced by the nature of the final layer of the coalescing bed, by the interfacial tension between the phases and by the relative proportion between the dispersed phase and the continuous phase; these observations explain the limitations of these processes.

When the material of the final layer of the coalescing bed is of the same nature as the rest of the bed and is preferably wetted by the dispersed phase, the ejection of the liquid threads is effected in very poor conditions and as soon as the passage velocity attains the critical velocity, a foam or a scum appears at the discharge from the bed instead of coalesced large drops: the separation by decantation is then only partially accomplished. The following explanation is proposed: the final layer of the bed which is preferably wetted by the dispersed phase has a tendency to retain the liquid threads of this phase and the ejection is produced under the hydrodynamic pressure of the continuous phase. At any rate, as soon as the passage velocity exceeds the critical velocity, this continuous phase breaks the threads and transforms them into scum or foam. This phenomenon of refraction of the dispersed phase is proportionally greater as the interfacial tension between phases is weaker and as the dispersed phase is found in greater quantity in relation to the continuous phase, which explains that, in practice, the emulsions with very low interfacial tension cannot be resolved or that it is difficult to resolve emulsions with large proportion of dispersed phase.

To avoid these faults, the last layer of the coalescing bed can be replaced by a layer of different nature, either neutral or preferably wetted by the continuous phase. This final layer is then not wetted by the dispersed phase and, at low velocity, the liquid threads are ejected in the form of large coalesced drops. At any rate, as soon as the passage velocity increases, the aforementioned jet phenomenon is produced for this type of material: the drops elongate upon discharge and burst into a multitude of droplets. The diameter of these droplets is very homogenous, even if this is not the case in the original emulsion, and decreases when the velocity increases, or when the interfacial tension between phases becomes weaker, or even when the proportion of dispersed phase is greater.

The second stage of the process according to the invention consists of use of the result obtained which are summarized above. The main idea was the following: on the one hand, use of a process with fixed bed preferably wetted by the dispersed phase to optimize the second stages. On the other hand, as it does not seem possible in this type of process, to improve the development of the fourth stage which is the only one to limit in practice the performances or the field of application of phenomena of coalescence, it can be purely and simply deleted, avoiding the ejection of liquid threads from the dispersed phase at the edge of the coalescing bed.

For this, in the above defined conditions, the process according to the invention consists of guiding these liquid threads from the coalescing bed to the already decanted layer. To assure that this guiding is satisfactory while avoiding breakage of these threads, the packing used is comprised of a material in particle or porous state which is preferably wetted by the dispersed phase. Its end is immersed in the already decanted layer and the threads of the dispersed phase which are displaced along this packing enter into this layer without ejection stage. The effect of the density differential allows the continuous phase to escape laterally or opposite the flow direction of the dispersed phase A defined by the guide.

It is established that as long as the guide is immersed in the already separated liquid layer, in other words as long as it assures its continuous guide function and deletes the ejection, an increase of the passage velocity well beyond the critical velocity has no influence on the separation, which continues satisfactorily. Also, experiments have shown that the process permits separation of the emulsions with low interfacial tension or emulsions having a large proportion of dispersed phase.

Moreover, tests have shown that the process permits separation of the two phases of very low density differential by the phenomenon of capillary attraction of the dispersed phase along the guide.

It is also to be noted that by deleting the ejection stage, the decantation of the large coalesced drops in the continuous phase is also deleted, and thus another phenomenon which is produced in traditional processes is avoided, that being a phenomenon of accumulation of coalesced drops at the interface. In effect, the fusion of each drop in the separated phase requires a certain length of time, and if the frequency of input of the drops exceeds a predetermined threshold, particularly owing to a heightened connection between dispersed phase and continuous phase, as accumulation is produced, and at the point of interface there is an intermediate zone where the phases are mixed, and this zone can extend gradually to the decanter unit.

Before furnishing detailed examples, four embodiments of devices to carry out the process will be described in reference to the attached drawings.

Figure 1:
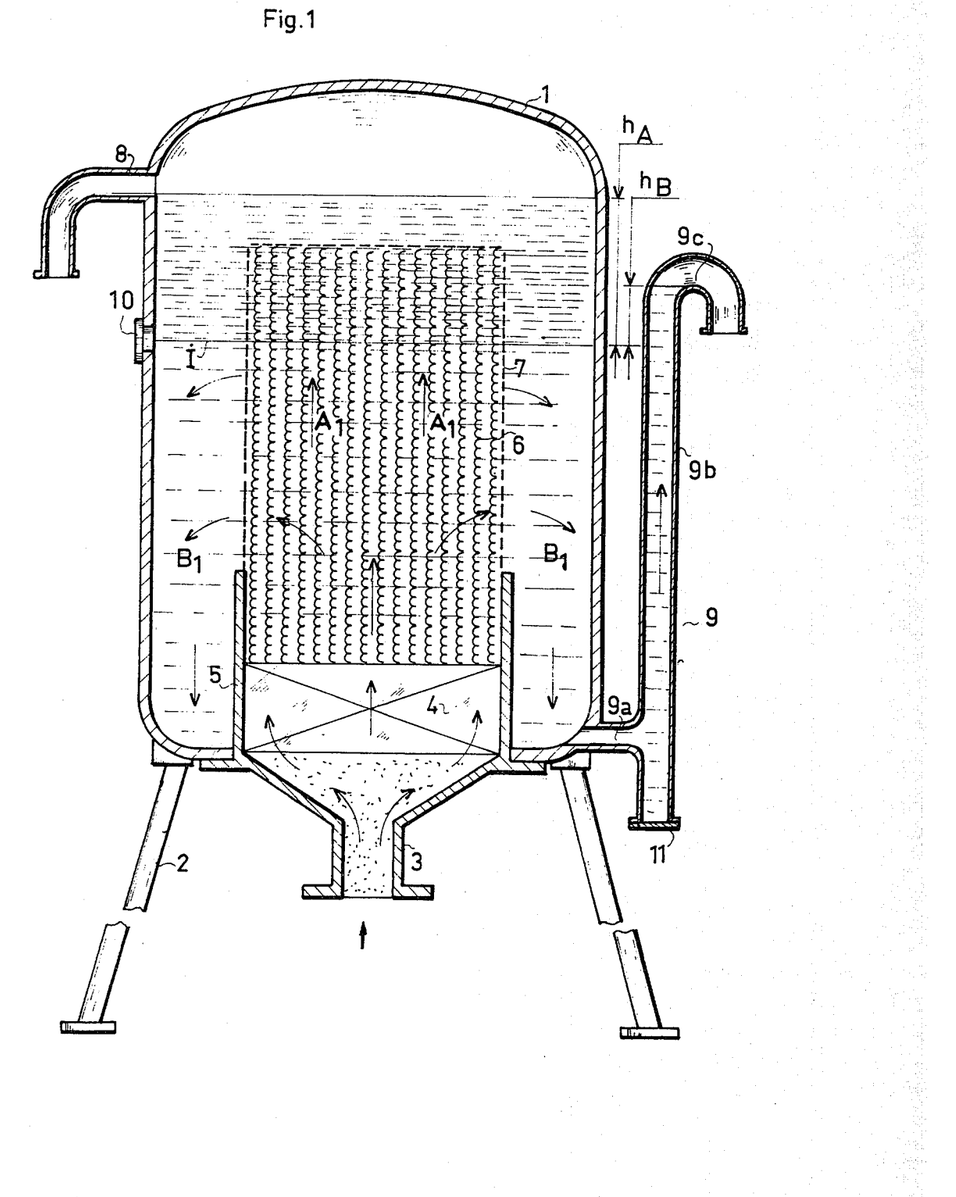
FIG. 1 shows a diagrammatic cross section through a vertical axial plan of a device for separation of an emulsion comprised of a dispersed phase $A_1$, of lower density than that of the continuous phase $B_1$.

The device shown as an example in FIG. 1 permits separation of a direct emulsion of an organic dispersed phase $A_1$, less dense, in an aqueous continuous phase, phase $B_1$, more dense.

This device is comprised of an enclosure 1 on feet 2 having an emulsion inlet conduit 3 at its base. This conduit opens through a divergent section into a coalescing bed 4 found at the bottom of the enclosure. This coalescing bed is found in one part of the section of enclosure 1 in a cylindrical skirt 5 which holds it and which extends the divergent portion of conduit 3.

This coalescing bed 4 is formed of a material in particulate state, preferably wetted by dispersed phase $A_1$ of the emulsion; in the case of an organic dispersed phase, this bed can be constituted of glass fibers which are rendered hydrophobic by suitable treatment.

Skirt 5 extends beyond and above coalescing bed 4 to assure maintenance of a guide 6 rising above it up to the top of the enclosure. This guide is extended, as the coalescing bed, on a part of the section of the enclosure and protects a peripheral chamber in the enclosure; it is open at the side to communicate with this chamber. An open basket as shown by broken line 7 can be provided to help hold guide 6.

This guide comprises a packing of a particulate material, preferably wetted by dispersed phase $A_1$ of the emulsion; it is to be noted that there is nothing preventing guide 6 from being of the same material as coalescing bed 4 and being an extension of the bed. At any rate, the guide will preferably be provided with a higher vacuum coefficient than the bed, to reduce losses of charge. For example, in the case of a hydrocarbon aqueous emulsion, this packing is a hydrophobic material, particularly a high vacuum coefficient packing of the "Multiknit" type, treated to be hydrophobic.

Enclosure 1 is provided at the top with means 8 for removal of the dispersed phase, and means 9 which opens in the peripheral chamber lower on the enclosure for removal of the continuous phase. These means 8 and 9 are adapted to remove the separated phases after decantation, such that interface I between them is situated at mid level on the guide. Thus, the guide immerses constantly with its top portion in the top layer of phase $A_1$, which is already decanted.

In the example, removal means 8 is very simply constituted of a conduit into which phase $A_1$ overflows and which opens from the enclosure above the level of the top end of guide 6. Means 9 for the drawing off is constituted of a conduit 9a which opens at the bottom part of the enclosure and is extended by an ascending conduit 9b provided with a top elbow 9c for overflow; this elbow 9c is mounted above the ideal position of the interface I at a height of $h_B = d_A/d_B \cdot h_A$ is the ideal thickness of the layer of phase $A_1$, the level between interface I and conduit 8, $d_A$ is the density of phase $A_1$ and $d_B$ is the density of phase $B_1$.

It is to be noted that the drawing off is automatically regulated, in other words if interface I tends to rise, if there is an excess of dense phase $B_1$, then dense phase $B_1$ is drawn off in greater quantity by overflow, which reestablishes the position of interface, and operates inversely in the opposite case. The interface of the phases is thus stablized at its ideal level I below the level of the top end of the guide. An inspection port 10 permits inspection of the position of this interface.

Also, a tap plug 11 is provided at the base of conduit 9b to permit drainage of this conduit and the enclosure.

In the device described, the emulsion is carried upward through coalescing bed 4 which is preferably wetted by dispersed phase $A_1$; the stages of interception, adhesion and migration develop in a satisfactory manner in this bed and at its top border occur a plurality of continuous liquid threads from phase $A_1$ arising in the continuous phase. Without breakage, these threads will moisten the packing of guide 6 and proceed upward along the guide under the effect of the density differential. Arriving interface I, each thread, still guided by guide 6, mixes in the top layer of phase $A_1$ with neither ejection nor formation of drops or anything else. Phase $B_1$ which is more dense is ejected laterally from the guide.

Figure 2:
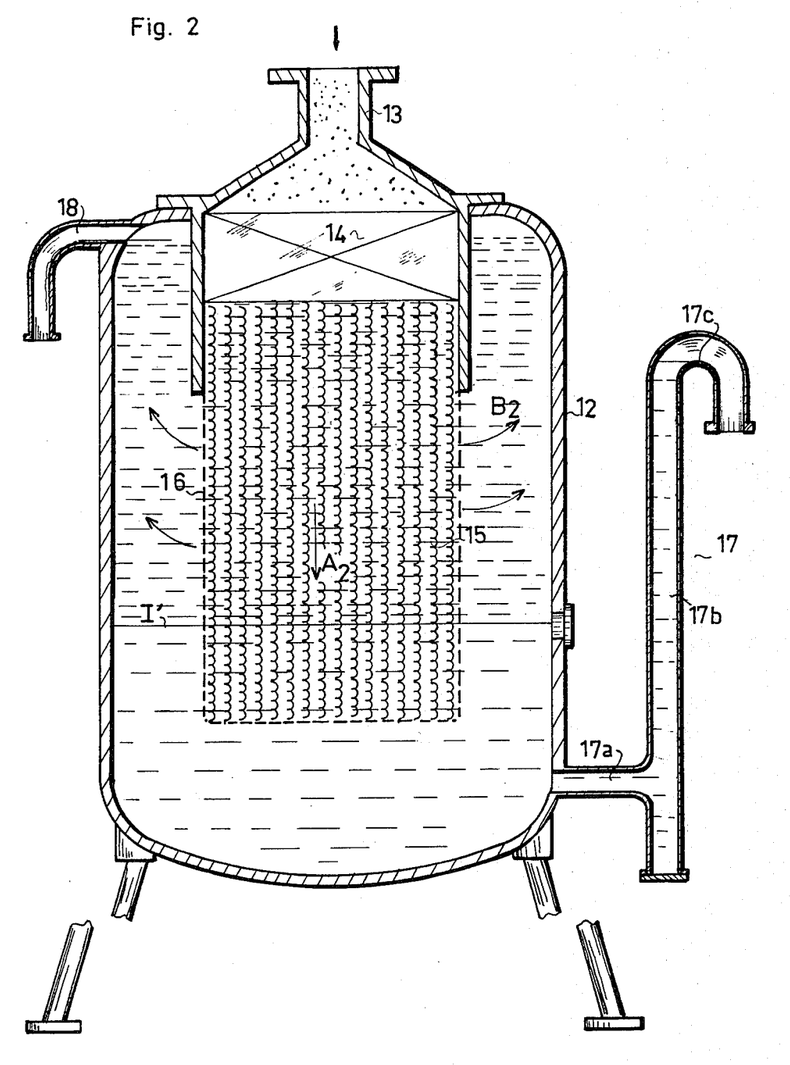
FIG. 2 shows a diagrammatic cross section through a vertical axial plan of a device for separation of an emulsion of a dispersed phase $A_2$ of greater density than that of the continuous phase $B_2$.

FIG. 2 shows a device for separation of an emulsion of which the dispersed phase $A_2$ is more dense than the continuous phase $B_2$, as found for example in an inverse emulsion of an aqueous phase dispersed in microdroplets in an organic continuous phase.

This device is analogous to the preceding but in inverse position; these means are:

an enclosure 12, provided at the top with an emulsion inlet conduit.

a coalescing bed 14 found at the top of the enclosure and into which opens conduit 13, and this bed is comprised of a particulate material, preferably wetted by dispersed phase $A_2$ of the emulsion, for example a hydrophilic material of the hydrophilic glass fiber type.

a guide 15, situated below this bed down to the bottom part of the enclosure and comprising a packing of a particulate material preferably wetted by dispersed phase $A_2$, for example a hydrophilic material with high vacuum coefficient with the packing of metallic fibers, and this guide extends to a part of enclosure 12 to define a peripheral chamber in this enclosure and is in this case lodged in a perforated basket 16.

drawing off means 17, for dispersed phase $A_2$, opening in the bottom of the enclosure, and drawing off means 18 for continuous phase $B_2$ opening in the peripheral chamber in the top part of the enclosure.

Drawing off means 17 and 18 are adapted to remove phases $A_2$ and $B_2$, separated after decantation, such that interface I' between them is situated at mid level on the guide.

As in the preceding case, the drawing off means of the less dense continuous phase can very simply be a conduit opening in the top part of the enclosure and through which this phase can flow by overflow, while on the other hand the drawing off means of the denser dispersed phase can be comprises of a conduit 17a opening below the bottom end of guide 15 and extending through an ascending conduit 17b provided with a top overflow elbow 17c, which is mounted at a level such that interface I' is stablized above the level of the bottom end of the guide.

In this device, the emulsion is passed downward through the coalescing bed 14. Dispersed phase $A_2$ which is more dense is guided downward toward the layer found at the bottom by means of guide 15 which immerses constantly into this layer. Continuous phase $B_2$, less dense, escapes laterally from the guide.

Figure 3:
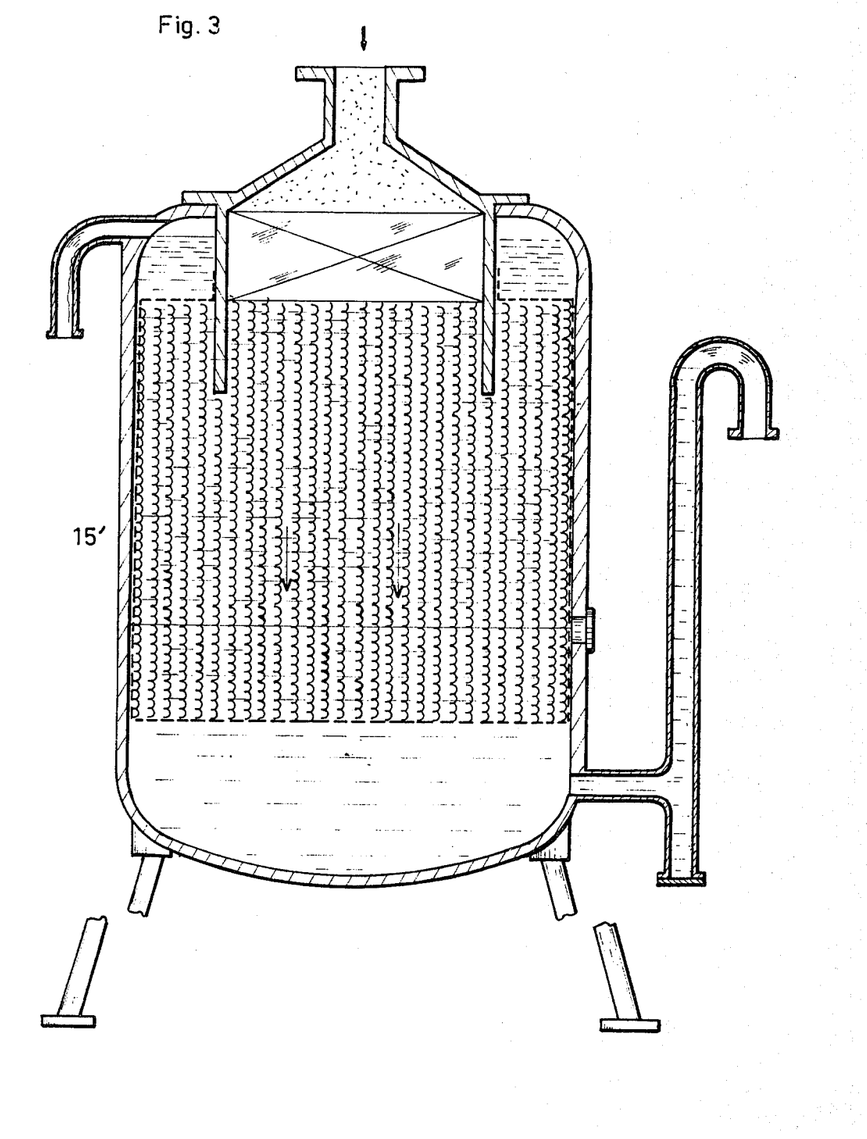
FIG. 3 shows a modification of the last device.

The modification in FIG. 3 is analogous to the preceding, but has a guide 15' which is extended, in one section at least, over the entire section of the enclosure. The phenomena are the same if there is only deletion of an additional phenomenon which is sometimes produced at great velocity in the case of a reduced section guide, that being a phenomenon of forced movement of a small proportion of dispersed phase to the side of the guide, with the formation of scum. Although limited, this phenomenon can be disturbing particularly in certain separation of inverse emulsions of low interfacial tension.

Figure 4:
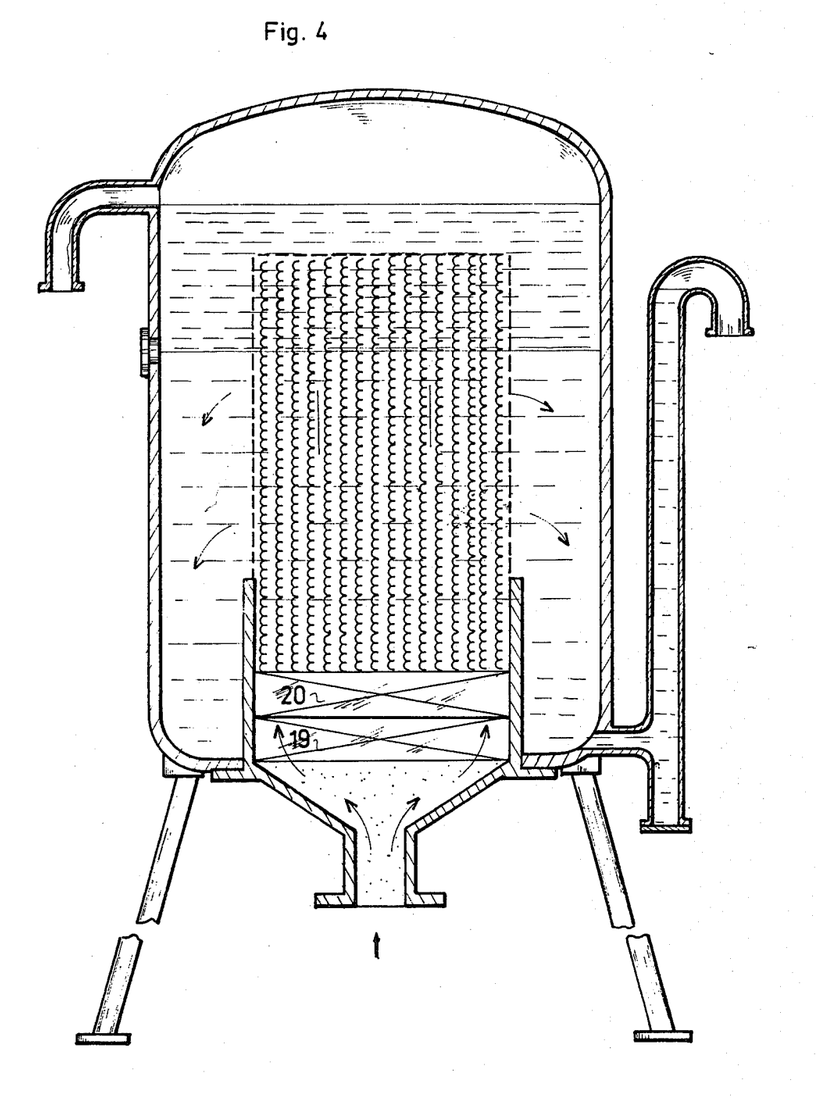
FIG. 4 shows a diagrammatic cross section through a vertical axial plan of a device for separation of an emulsion comprised of, on the one hand, an organic dispersed phase $A_3$ in direct emulsion in a continuous aqueous phase $B_3$, and on the other hand, an aqueous dispersed phase $A_4$ in inverse emulsion in an organic continuous phase $B_4$.

The device shown in FIG. 4 is intended to separate an emulsion of an organic dispersed phase $A_3$ in direct emulsion in an aqueous continous phase $B_3$, and an aqueous dispersed phase $A_4$ in inverse emulsion in an organic continuous phase $B_4$.

Such a device is shown because it solves a practical problem of resolution of emulsions, met in hydrometallurgy in metals extraction echnology and particularly in the extraction of uranium, which is the object of the example 5 hereinafter.

The device of FIG. 4 is analogous to that of FIG. 1, except that the coalescing bed is comprised of two superimposed layers 19 and 20 of particulate materials, the hydrophilic one situated below, the hydrophobic one rising above the other.

The emulsion is passed upward through this composite coalescing bed. Bottom layer 19 is preferably wetted by aqueous phases $B_3$ and $A_4$ and determines the formation of continuous aqueous threads such that the microdroplet of water mix in the aqueous continuous phase and that the inverse emulsion is resolved when the flux arrives at the second layer. The separation mechanism is then the same as that already described for the device in FIG. 1.

Hereinafter are given various comparative examples of separation. In these examples, the injection of the emulsions into the enclosures is realized by a motor driven pump of flow adjustable to between 0 and 25 liters/hour, which, in the various sections, corresponds to a specific passage velocity through the bed between 0 and 2.72 cm/sec.

The emulsions treated are emulsions of secondary type of which the droplet diameter is between 0.5 and 20 microns. These emulsions have been realized for each test by an emulsion generator permitting variation of the proportion of dispersed phase while effecting the flow of the corresponding body injected into the generator.

Unless otherwise stated, the coalescing bed used in the examples is 25 mm high and has a diameter of 18 mm, and the total enclosure has a diameter of 50 mm.

For direct emulsions, the proportion of hydrocarbon which are furnished have been determined by measurement of the Total Oxygen Demand, and the apparatus used is a TOD IONICS Model 225. The dosages have been made after homogenization by ultrasonic wave from an ultrasonic generator SONIMASSE 500 T.

For the inverse emulsions, the water proportions have been determined after homogenization by ultransonic wave, by the Karl FISCHER method by means of a BECKMAN Aquameter type KF4.

EXAMPLE NO. 1

The treated emulsion is a direct emulsion of kerosene dispersed in water, with very low interfacial tension of 2 dynes/cm. The concentration of the emulsion at input is 1600 mg of kerosene per liter.

(a) A first series of tests consists of treating the emulsion by a traditional device without guide of the dispersed phase, in which the coalescing bed is a granular bed of fluorocarbonated calcinated plate. The assembly of this bed is hydrophobic and preferably wetted by the organic phase.

(b) A second series of tests consists of treating the emulsion in a device of the type shown in FIG. 1, provided with a coalescing bed identical to the bed described hereinafter and with an organic phase guide constituted of a metallic packing which is coated beforehand with a fluorocarbonated glaze in order to render it hydrophobic; this packing is of the "MULTIKNIT" type, of stainless steel 18/10e MM of specific weight equal to 525 g/cm$^3$, of which the vacuum coefficient is 93.3%, and the fluorocarbonated glaze used for the treatment is of the FORAPERLE C 203 type (P.C.U.K.).

The diameter of the guide is the same as that of the coalescing bed and the total height of the guide is 150 mm: it immerses constantly into the top bed of separated kerosene. At the beginning this layer is formed gradually from the continuous threads of kerosene along the guide.

The table below gives the comparative results of the two series of tests (a) and (b) for an initial concentration of 1600 mg kerosene per liter.

| Flow l/h | Specific Velocity cm/s | Residual Concentration in mg/l Tests (a) (traditional) | Residual Concentration in mg/l Tests (b) (with guide) |
|---|---|---|---|
| 10 | 1.09 | 250 | 16.3 |
| 15 | 1.63 | 332 | 16.3 |
| 20 | 2.18 | 484 | 18.6 |
| 25 | 2.72 | 606.6 | 25.6 |

The solubility of kerosene is on the order of 20 mg/l, and it is established that the process of the invention (tests (b) allows entire resolution of the emulsion of kerosene for the entire range of velocities used and leaves only the dissolved fraction in solution in water.

On the contrary, the traditional process resolves the emulsion only very imperfectly even at low velocity; in fact, for such low interfacial tension emulsions, these processes are inoperable in practice because they leave too great a portion of organic pollution in the water. This pollution appears in the form of foam.

EXAMPLE NO. 2

Series of analogous tests (a) and (b) are carried out, but in this case, the last layer of the coalescing bed for the traditional tests (a), in other words the calcined plate, is hydrophilic.

For tests (b) with guide, a hydrophobic plate calcined according to the invention is used.

These tests are carried out with a kerosene emulsion in water with interfacial tension as high as 40 dynes/cm. The results are the following:

| Flow l/h | Specific Velocity cm/sec | Residual Concentration in mg/l Tests (a) (traditional) | Residual Concentration in mg/l Tests (b) (with guide) |
|---|---|---|---|
| 10 | 1.09 | 61.2 | 25.6 |
| 15 | 1.63 | 151.5 | 21 |
| 20 | 2.18 | 222.7 | 19.2 |
| 25 | 2.72 | 268.2 | 19.2 |

The process according to the invention operates at an efficiency level comparable to the above.

The traditional process permits resolution of the emulsion at low velocity but the residual concentration increases considerably as soon as the velocity increases. Then the jet phenomenon appears, with formation of microdroplets which are carried along in the continuous phase.

EXAMPLE NO. 3

The emulsion treated is an inverse emulsion of water in kerosene, of which the interfacial tension is 40 dynes/cm. The aqueous dispersed phase concentration in the kerosene is 1500 mg of water per liter. This emulsion is treated in a device as shown in FIG. 2, in a series of tests (a) with removal of guide 15 and in a second series (b) with this guide.

(a) the coalescing bed is a hydrophilic bed constituted of hydrophilic glass fibers packed on a hydrophilic calcined plate.

(b) the coalescing bed used in tests (b) is identical to the above described bed and is extended toward the bottom by a guide constituted of a packing of hydrophilic steel wool contained in a basket and of which the vacuum coefficient is 96%.

The table below shows the results obtained when the water concentration at input is 1500 mg water per liter.

| Flow l/h | Specific Velocity cm/sec | Residual Concentration in mg/l Tests (a) (traditional) | Residual Concentration in mg/l Tests (b) (with guide) |
|---|---|---|---|
| | | (average) | |
| 10 | 1.09 | 900 | 50 |
| 15 | 1.63 | 1000 | 57 |

-continued

| Flow l/h | Specific Velocity cm/sec | Residual Concentration in mg/l Tests (a) (traditional) | Residual Concentration in mg/l Tests (b) (with guide) |
|---|---|---|---|
| 20 | 2.18 | 1200 | 55 |
| 25 | 2.72 | 1300 | 66 |

The tests (b), the kerosene is transparent at discharge; the water is soluble in the kerosene at a rate on the order of 50 mg per liter, and all of the water in emulsion has been separated.

But in tests (a), the water leaves the coalescing bed in the form of foam which bursts into microdroplets carried in the continuous phase. The residual concentrations are raised and the separation is unsatisfactory.

EXAMPLE NO. 4

In this example the emulsion which is treated is an inverse emulsion of water in kerosene, of which the interfacial tension is 2 dynes/cm. This emulsion is treated in a device as in FIG. 3, wherein the bed extends over the entire section of the enclosure.

The flow and the specific velocity are respectively 10 l/hr and 1.09 cm/sec in the coalescing bed, and the initial concentration of water in kerosene is varied to realize a series of tests (a) without guide and a series of tests (b) with guide. The coalescing bed and the guide are of identical nature to those in the preceding example.

The table below shows the results obtained.

| Initial concentration mg water/l | Residual concentration Tests (a) (Traditional) in mg/l | Residual concentration Tests (b) (With Guide) in mg/l' |
|---|---|---|
| | (average) | |
| 1300 | 760 | 138 |
| 1600 | 1000 | 115 |
| 2200 | 1800 | 160 |
| 2500 | 2000 | 140 |

The solubility of the water in this kerosene is on the order of 150 mg/l.

The phenomenon of ejection of the water in the form of foam is found to be even more pronounced in tests (a) than in the preceding example. The conclusions are the same.

EXAMPLE NO. 5

For this example, the conditions found at the extraction of the uranium were simulated; this extraction leads to an emulsion containing an aqueous phase charged with uranium salts in solution and organic solvent, and the emulsion which must subsequently be separated. In practice, this emulsion is a mixture of a direct emulsion of organic solvent dispersed in the aqueous phase and an inverse emulsion of aqueous phase dispersed in the organic phase.

An emulsion of this type has been realized for this example by means of samples from the Societe Industrielle des Minerais de l'Ouest (S.I.M.O.) of Bessines-sur-Gertempe, and they had the following characteristics:

acid aqueous phase, pH 1.55, containing 0.5 g/l uranium salts, of 0.97 density, organic solvent phase of 0.75 density and of which the interfacial tension in relation to the aqueous phase is 15.5 dynes/cm.

The emulsion had a weight ratio of (organic solvent/aqueous phase) of 1.25.

This emulsion is treated in a device as shown in FIG. 4, of which the coalescing bed has a diameter of 24 mm; it is composed of an inside layer of 5 cm of hydrophilic glass fibers, not treated, under a layer of 5 cm of glass fibers which are fluorocarbonated to render them hydrophobic; these fibers are of the "Sovirel" type, with diameter between 5 and 7 microns and they are packed in compact layer.

For tests (a), the bed is used alone, and for tests (b), it has a guide rising over it which is constituted of a Multiknit packing, as described in Example 1.

If the increased diameter of the coalescing bed is taken into consideration, the motor driven pump assembly used to inject the emulsion is chosen with power to assure flows of up to 31.3 l/hour.

The table below shows the results obtained:

| Flow l/hr. | Velocity cm/sec | Residual concentration of organic phase in aqueous phase | | Residual concentration of the aqueous phase in the organic phase | |
|---|---|---|---|---|---|
| | | Tests (a) (Without guide) | Tests (b) (With guide) mg/l | Tests (a) | Tests (b) mg/l |
| 5.6 | 0.32 | No separation | 7.5 | No separation | 3700 |
| 10.8 | 0.66 | No separation | 6.8 | No separation | 3700 |
| 16 | 0.98 | No separation | 7.5 | No separation | 3800 |
| 21.6 | 1.33 | No separation | 8.2 | No separation | 3800 |
| 26.4 | 1.62 | No separation | 40 | No separation | 5900 |
| 31.3 | 1.93 | No separation | 40 | No separation | 11800 |

These results call for the following comments:

For the tests (b), carried out according to the process of the invention, the separation is perfect up to velocities on the order of 1.3 cm/sec.; the residual concentration on the order of 10 mg/l of organic solvent in water, or 3800 mg/l of water in the solvent corresponding to the dissolved fraction of these solvents.

For the tests (a), carried out without coalescing guide, it is established that a foam of the organic phase appears at very low velocity, at 0.15 cm/sec., and the separation is not effected because the foam is carried along in the aqueous phase. When the flow increases, the volume of foam increases and becomes finer and finer and therefore more easily carried along.

A series of complementary traditional tests have been carried out by inverting the position of the hydrophilic and hydrophilic layers of the bed, so that the hydrophilic layer is situated over the hydrophobic layer. Even in this case the separation is not realized. The appearance of large number of "drip points" on the surface of the coalescing bed is established at very low velocity, from 0.15 cm/sec., in other words pinpoint zones through which the organic phase is ejected from the bed in the form of drops; these drops have a relatively small diameter, on the order of 1 to 2 mm, and very numerous as a result of the high proportion of organic phase in the aqueous phase. These drops are too numerous to coalesce at the interface in the decanter and, after a few hours, they spread out in the entire decanter and are carried along with the aqueous phase without separation.

If the passage velocity is increased to 0.32 cm/sec., the appearance of jet phenomenon at discharge from the coalescing bed is established, wherein the organic phase bursts into a multitude of droplets of less than 100 microns diameter, which are carried along in the aqueous phase.

The separation is thus impossible with this type of process, whatever be the arrangement of the bed, because of the too close relationship of the phases.

We claim:

1. A process for the continuous separation of a secondary emulsion of at least one dispersed phase comprising droplets of a diameter of between 0.5 and 20 microns emulsified in at least one continuous phase of different density comprising:
    providing a vessel having an emulsion inlet and outlets for the separated dispersed and continuous phases and a fixed coalescing bed adjacent said emulsion inlet, said coalescing bed having a closed periphery so that supplied emulsion passes substantially solely axially through said bed,
    providing guide means in contact with said bed and extending downstream away from said bed, said guide means comprising a packing of a particulate or porous material of high porosity and less density than said bed and being wettable by said dispersed phase,
    causing said emulsion to flow vertically through said emulsion inlet and through said bed for achieving a good coalescence of microdroplets of said dispersed phase and continuing the flow of said emulsion vertically whereby the coalesced dispersed phase is directly axially by said guide means to the end thereof away from said bed where a layer of said coalesced phase is established in contact with said end guide means away from said bed, and the continuous phase flows radially outwardly from said guide means into a peripheral space between said guide means and said vessel, said separated phases thereby forming two layers in said vessel,
    withdrawing said separated phases through the respective outlets at a rate of such that the interface between said layers remains substantially axially midway between the ends of said guide means.

2. A process as in claim 1 and wherein said dispersed phase has a lower density than said continuous phase and passing said emulsion upwardly through said bed, the coalesced dispersed phase forming the upper of said layers and the continuous phase forming the lower of said layers.

3. A process as in claims 2 or 4 and including passing said emulsion through said bed at a specific passage velocity of between 0 and 2.72 cm/sec.

4. A process as in claim 1 and wherein said dispersed phase has a greater density than said continuous phase and passing said emulsion downwardly through said bed, the coalesced dispersed phase forming the lower of said layers and the continuous phase forming the upper of said layers.

5. A process as in claim 1 and wherein said emulsion comprises a first organic, dispersed phase in direct emulsion in a second, aqueous continuous phase and a third, aqueous dispersed phase in inverse emulsion in a fourth organic continuous phase, said bed comprising two superimposed layers, one of said layers being of a hydrophilic material in porous or particulate state for resolution of said direct emulsion, said packing being of a hydrophobic material, and passing said emulsion upwardly through said bed.

6. An apparatus as in claim 5 and wherein the material of said bed comprises glass fibers coated so as to be hydrophobic and the material of said guide means comprises metal fibers coated so as to be hydrophobic.

7. An apparatus for the separation of a secondary emulsion of a dispersed phase comprising droplets of a diameter of between 0.5 and 20 microns emulsified in a continuous phase of greater density comprising:
    a vessel having an emulsion inlet at the bottom thereof, a dispersed phase outlet near the top thereof, and a continuous phase outlet near the bottom thereof,
    a coalescing bed in direct communication with said emulsion inlet and comprising a porous or particulate material wettable by the dispersed phase and being closed at its periphery by a skirt extending upwardly from the bottom of said vessel around said emulsion inlet,
    said guide comprising a packing of a particulate or porous material of high porosity and less density than said bed wettable by said dispersed phase extending upwardly from the top of said bed to a point near the top of said vessel, said skirt extending upwardly above the top of said bed so as to enclose a portion of the lower part of said guide means and the remainder of said guide means being open at its periphery and spaced inwardly from the walls of said vessel,
    said outlets being arranged so as to maintain the interface of the separated phases in said vessel at approximately the axial middle of said guide means above said skirt.

8. An apparatus as in claim 7 wherein said dispersed phase outlet is positioned above the top of said guide means and the continuous phase outlet comprises a conduit opening near the bottom of said vessel and extending upwardly to an overflow elbow mounted at a height such as to maintain the phase interface in said vessel below the top of said guide means.

9. An apparatus as in claim 7 and wherein said bed comprises a layer of hydrophobic material and a layer of hydrophilic material.

10. An apparatus as in claim 7 and including means for passing said secondary emulsion through said bed at a specific passage velocity of between 0 and 2.72 cm/sec.

11. An apparatus for the separation of a secondary emulsion of a dispersed phase comprising droplets of between 0.5 and 20 microns emulsified in a continuous phase of lower density comprising:
    a vessel having an emulsion inlet at the top thereof, a dispersed phase outlet near the bottom thereof, and a continuous phase outlet near the top thereof,
    a coalescing bed in direct communication with said emulsion inlet and comprising a porous or particulate material wettable by the dispersed phase and being closed at its periphery by a skirt extending downwardly from the top of said vessel around said emulsion inlet,
    guide means comprising a packing of a particulate or porous material of high porosity and less density than said bed and wettable by the dispersed phase extending downwardly from the bottom of said bed to a point near the bottom of said vessel, said skirt extending downwardly from the bottom of said bed so as to encircle a portion of the upper part of said guide means and the remainder of said guide means being open at its periphery and spaced inwardly from the walls of said vessel, said outlets being arranged so as to maintain the interface of the separated phases in said vessel at approximately the axial middle of said guide means below said skirt, and means for passing said secondary emulsion through said bed at a specific passage velocity of between 0 and 2.272 cm/sec.

12. An apparatus as in claim 11 and wherein the material of said bed comprises hydrophilic glass fibers and said guide means comprises a high porosity packing of hydrophilic metal fibers.

13. An apparatus as in claim 11 and wherein said continuous phase outlet is positioned near the top of said vessel and said dispersed phase outlet comprises a conduit opening near the bottom of said vessel and extending upwardly to an overflow elbow mounted at a height such as to maintain the phase interface in said vessel below the bottom of said skirt and above the bottom of said guide means.

* * * * *